(Model.)
C. KING.
Potato Digger.
No. 243,578. Patented June 28, 1881.
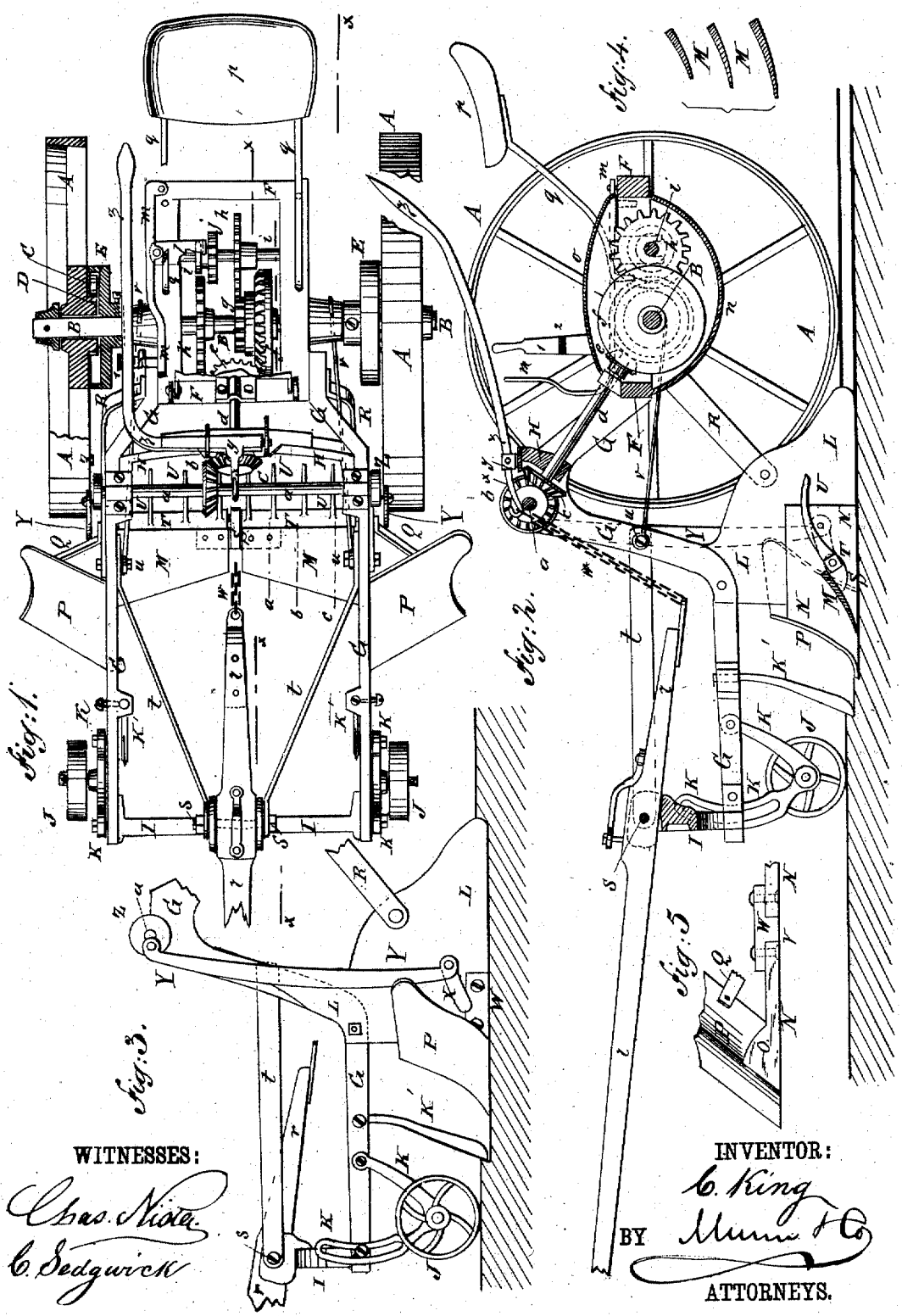
WITNESSES:
Chas. Nister
C. Sedgwick
INVENTOR:
C. King
BY Munn & Co
ATTORNEYS.

UNITED STATES PATENT OFFICE.

CHESTER KING, OF LEADVILLE, COLORADO.

POTATO-DIGGER.

SPECIFICATION forming part of Letters Patent No. 243,578, dated June 28, 1881.

Application filed April 20, 1881. (Model.)

*To all whom it may concern:*

Be it known that I, CHESTER KING, of Leadville, in the county of Lake and State of Colorado, have invented a new and useful Improvement in Potato-Diggers, of which the following is a full, clear, and exact description.

Figure 1 is a plan view, partly in section, of my improvement. Fig. 2 is a sectional side elevation of the same, taken through the line $x$ $x$ $x$, Fig. 1. Fig. 3 is a side elevation of the forward part of the machine. Fig. 4 are sectional elevations of one of the plowshares, taken through the lines $a$ $b$ $c$, Fig. 1. Fig. 5 is a bottom view of a part of a landside and share.

The object of this invention is to facilitate the digging of potatoes.

A are the wheels, which are connected with the axle B by pawls C and ratchet-wheels D. The pawls C and ratchet-wheels D are inclosed and protected from dirt by casings E, which are attached to the axle B and serve as supports for the pawls C. The axle B revolves in bearings attached to the forward parts of the side bars of the frame F.

To the forward ends of the side bars of the frame F are bolted the rear ends of two bars, G, which incline upward and forward, are bent downward in a vertical direction, or nearly so, and are then bent forward in a horizontal direction, or nearly so, as shown in Fig. 2, so as to serve as beams for the plows.

To the bars G, a little in the rear of their upper angles, are attached the ends of a cross-bar, H, and to the forward ends of the said bars G are attached the ends of the cross-bar I.

The forward part of the machine is supported by the small wheels J, which are pivoted to the angles of the V-shaped standards K. The end of the rear arms of the standards K are pivoted by bolts to the bars G, near the rear ends of their horizontal parts. The forward arms of the standard K are curved upon the arcs of circles having their centers at the pivots of their rear arms, and are slotted longitudinally to receive the bolts by which they are secured to the bars G, so that by loosening the said fastening-bolts the forward end of the frame can be raised and lowered to regulate the depth to which the plows enter the ground.

To the horizontal parts of the bars G are also attached colters K', to separate the vines and cut the roots in front of the plows.

To the upright parts of the bars G are bolted the narrow upper parts of the plates L, the rear lower parts of which project back so as to cover the inner sides of the lower forward parts of the wheels A, to prevent soil, stones, and clods from falling into the furrows in which the said wheels travel, and thus affecting the level of the machine, and also to prevent potatoes from getting in front of the said wheels and being crushed.

M are the shares of the plows, the outer end of each of which is formed solid with the vertical plate or landside N. The landside N is firmly bolted to the inner side of the lower forward part of the plate L, and has a flange or rib, O, formed upon the outer side of its forward edge. The forward side of the rib or flange O is beveled and concaved to form a seat for the mold-board P, which is securely bolted to the said rib or flange O. The mold-boards P are further strengthened by the stays or braces Q, the outer ends of which are bolted to the said mold-boards P, and their inner ends are bolted to the plates L. The plates L are strengthened against the rearward push of the plows M P by the braces R, the forward ends of which are bolted to the rear upper parts of the said plates L, and their rear ends are bolted to the rear ends of the bars G. The inner ends of the shares M nearly meet at the center line of the machine, and their rear or upper edges are horizontal, or nearly so. The lower edges of the shares M are also horizontal and incline to the rearward from their outer to their inner ends. The upper surface of the shares M, at their outer ends, is inclined or slightly convexed, which inclination increases toward the inner edges of the said shares, as shown in Fig. 4. With this construction the edges of the shares will make a drawing cut, and will thus pass through the soil more easily, and will more readily cut off roots, or cause the said roots to slide along the said edges to and pass through the narrow place between the inner ends of the said shares.

S is a block, the upper part of which fits into the upper part of the space between the inner ends of the shares M. The block S has lugs upon its sides, which underlap and are bolted to the upper parts of the inner ends of the shares M. The lower part of the block S has a perforation, socket, or eye formed in it to receive the journals at the inner ends of the bars or heads T, that carry the fingers U. The fingers U are curved upward, rearward, and downward in such a manner that the rear ends of the outer fingers will be a little lower than the rear ends of the inner fingers, so as to more thoroughly separate and spread the soil and potatoes, the soil falling through the spaces between the fingers U, and the potatoes falling from the rear ends of the fingers U on top of the soil. The outer journals of the heads or bars T work in the upper ends of the slots V formed in the lower parts of the vertical plates or landsides N. The slots V lead up from the lower edges of the landsides N, and are closed by blocks W, which form the bearing for the journals of the bars or heads T, and have lugs or flanges upon their sides to overlap the outer sides of the said landsides N, and receive the bolts that secure the said bearing-blocks W in place.

Upon the outer ends of the outer journals of the bars or heads T are formed crank-arms X, which project upward and rearward, and to their outer ends are pivoted the lower ends of the connecting-bars Y. The cranks X and the lower ends of the connecting-bars Y are protected from the soil by the mold-boards P, so that they do not need to be inclosed. The upper ends of the bars Y are pivoted to the pins of the cranks or crank-wheels Z, attached to the ends of the shaft $a$, which works in bearings attached to the bars G at their upper angles, so that the fingers U will be vibrated to separate the soil and potatoes by the revolution of the shaft $a$.

To the middle part of the shaft $a$ is attached a beveled-gear wheel, $b$, the teeth of which mesh into the teeth of the beveled-gear wheel $e$, attached to the forward end of the shaft $d$. The shaft $d$ revolves in bearings attached to the cross-bar H of the bars G and to the forward cross-bar of the frame F.

To the rear end of the shaft $d$ is attached a small beveled-gear wheel, $e$, the teeth of which mesh into the teeth of the large beveled-gear wheel $f$. The beveled-gear wheel $f$ runs loose upon the axle B, and with it is rigidly connected a small gear-wheel, $g$, the teeth of which mesh into the teeth of the large gear-wheel $h$, attached to the shaft $i$. The shaft $i$ is parallel with the axle B, revolves in bearings attached to the rear parts of the side bars of the frame F, and upon it is placed the small gear-wheel $j$, which slides upon the said shaft $i$, so that it can be thrown into and out of gear with the gear-wheel $k$, attached to the axle B. The gear-wheel $j$ is connected with the shaft $i$ by a tongue and groove or other suitable means, so that it will carry the said shaft with it in its revolutions. The outer end of the hub of the sliding gear-wheel $j$ has a ring-groove formed around it to receive the forked lower end of the bar $l$, which is bent outward at right angles, and its outer end is pivoted to the lever $m$. The rear end of the lever $m$ is pivoted to the rear end of the side bar of the frame F, and its forward part, at the forward end of the said frame F, is bent upward at right angles, so that it can be conveniently reached and operated by the driver from his seat to throw the gearing into and out of gear with the drive-wheels. The lever $n$ is held in either position by a catch attached to the frame-work of the machine.

To the lower side of the frame F is attached a casing, $n$, to cover and protect the lower parts of the gearing. The upper part of the gearing is covered and protected by a cover, $o$, which is hinged at its forward end to the forward end of the frame F, so that it can be raised to give convenient access to the gearing when required.

$p$ is the driver's seat, which is attached to the upper ends of two standards, $q$. The standards $q$ are bent downward, forward, and downward, and their lower ends are inserted in holes in the side bars of the frame F. Two sets of holes are formed in the frame F to receive the ends of the standards $q$—one set at the middle part of the said frame F for use when the machine is at work, and the other set near the rear end of the frame F, for use when passing from place to place to allow the driver's weight to assist in holding the forward part of the machine raised from the ground.

$r$ is the tongue, which is hinged to and between two lugs formed upon the middle part of the upper side of the forward cross-bar, I, by a bolt, $s$. The bolt $s$ also secures the forward ends of two braces, $t$, the rear ends of which are secured to the upright parts of the bars G by bolts $u$. The bolts $u$ also secure the forward ends of the braces $v$, the rear ends of which are secured to the frame F or to the axle-bearings attached to the said frame. The braces $t\,v$ strengthen the tongue $r$ against lateral strain, and also distribute the shaft-strain to the main parts of the frame. The tongue $r$ projects in the rear of the cross-bar I, and to its rear end is attached the end of a short chain, $w$, a rod or other suitable connection. The other end of the chain $w$ is hooked upon the end of the arm X, formed upon or attached to the shaft $y$, which works in bearings attached to the cross-bar H.

To one end of the shaft $y$ is attached, or upon it is formed, a lever, $z$, which projects back into such a position that it can be readily reached and operated by the driver from his seat. The lever $z$, shaft $y$, and arm $x$ form a bent lever. The rear part of the lever $z$ moves up and down along a spring catch-bar, 1, attached at its lower end to the frame F, and which has a shoulder, 2, formed upon it to receive and hold the lever $z$ when the said lever is lowered to raise the forward part of the machine from the ground.

With this construction, when the machine is drawn forward the colters K' separate the vines in front of the plows, the mold-boards P remove clods, stones, rubbish, and soil from the sides of the hills, and the shares M raise the soil and potatoes and deliver them to the vibrating fingers U, by which the soil and potatoes are separated, and the potatoes dropped to the ground upon the top of the soil.

Having thus described my invention, what I claim as new, and desire to secure by Letters Patent, is—

1. In a potato-digger, the share M and landside N, constructed substantially as herein shown and described, made in one piece, the share M being narrower and more inclined toward its inner end, and the landside N having a flange, O, along its forward edge to form a seat for the mold-board, as set forth.

2. In a potato-digger, the combination, with the landside N, having share M and flange O, of the mold board P, substantially as herein shown and described, whereby stones, rubbish, and soil are removed from the side of the hills, as set forth.

3. In a potato-digger, the combination, with the share M and landside N, of the curved fingers U, the head T, and the crank X, made in one piece, a vibrating mechanism, and the bearing-blocks S and W, substantially as herein shown and described, whereby the potatoes are separated from the soil and dropped upon the top of the soil, as set forth.

CHESTER KING.

Witnesses:
 JOHN JAMES TRIMBLE,
 DELANCY C. KING.